July 3, 1951  G. R. STEELE  2,559,134

LUBRICATION SYSTEM

Filed July 2, 1948

INVENTOR
Glen R. Steele
BY
Bean, Brooks, Buckley & Bean.
ATTORNEYS

Patented July 3, 1951

2,559,134

UNITED STATES PATENT OFFICE 2,559,134

LUBRICATION SYSTEM

Glen R. Steele, Pleasant Ridge, Mich., assignor to Uebelhoer Brothers, Inc., Buffalo, N. Y.

Application July 2, 1948, Serial No. 36,762

8 Claims. (Cl. 184—11)

This invention relates to a lubricating system for internal combustion engines, pumps, and like mechanisms having bearings and piston arrangements which must be lubricated when in operation. More particularly the invention relates to the splash type lubricating system wherein a member is designed for being moved into a bath of lubricant for splashing the oil onto the moving parts of the mechanism for effecting a lubrication of such parts. Such member is sometimes referred to as a dip member and is carried by the crank shaft, or an associated part, for moving in a circular path within the crank case or chamber in which the bath of oil is disposed adjacent the lower arc of such path for the purpose of having the dip member swing down into the bath and scoop out a quantity of the lubricant to be thrown thereby up onto the crank shaft and other moving parts accessible from the crank chamber. The splash of oil is usually sufficient to maintain proper lubrication of all the parts with the exception of the piston itself which, due to the fact that its path of movement is well up within the cylinder, and the splash is to a measure blocked by the overhanging crank shaft and the piston rod coupling thereto, has little benefit from the splash and must rely upon the vapor or meager oil supply to maintain its operation. Obviously this causes undue wear and serves to impair the efficiency of the engine or other mechanism.

The object of the present invention is to provide an improved splash lubricating system by which the lubricant is more effectively applied to the cylinder walls so as to increase the efficiency and maintain the operation of the parts practical.

A further object of the invention is to provide a splash lubricating system in which the lubricant that is scooped up from the bath is directly transmitted to the piston and cylinder wall as well as upon other moving parts which heretofore have been inaccessibly disposed for all practical purposes.

More particularly the invention will be found to reside in the use of a diverter timed to catch the scooped-up lubricant from the dip member and to throw or relay it around the crank shaft up onto the cylinder wall and piston whereby the latter will have an ample supply of lubricant for efficient operation.

The foregoing and other objects will manifest themselves as the following description progresses, reference being had to the accompanying drawing, wherein Fig. 1 is a side elevation of an internal combustion engine, with portions broken away to more clearly disclose the present invention;

Figure 1:
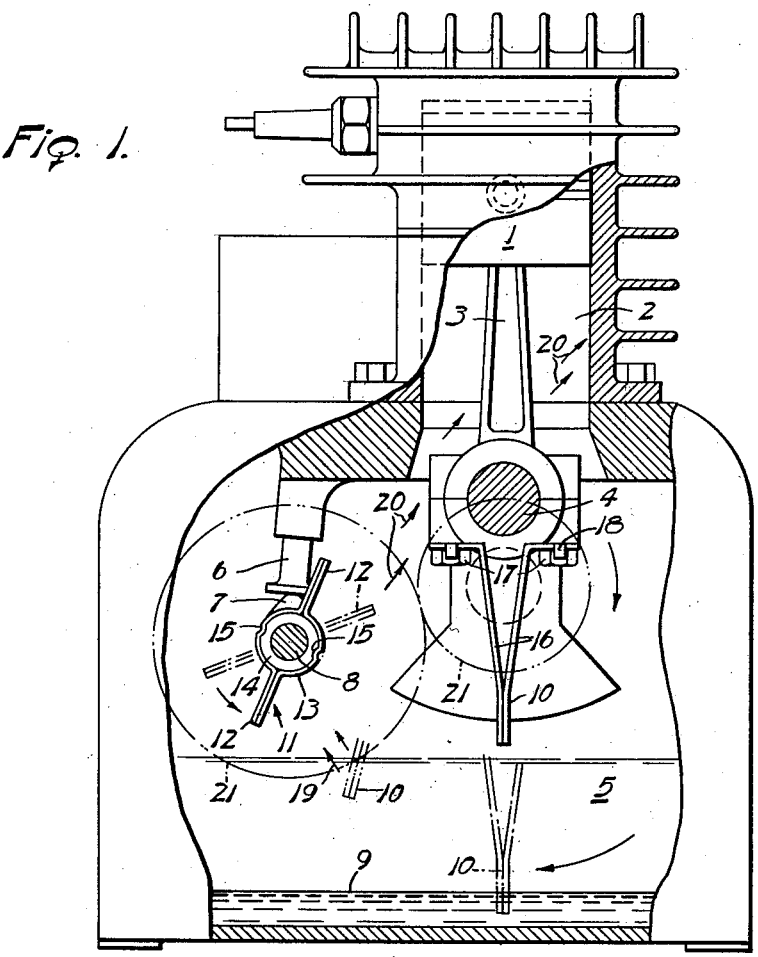
Figure 2:
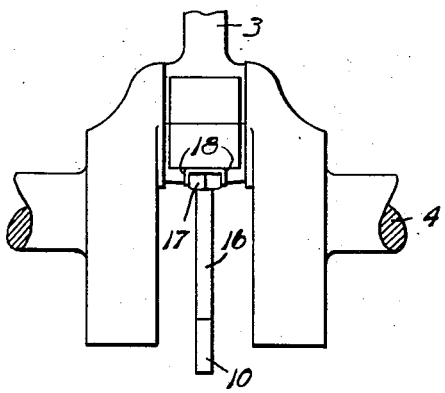
Fig. 2 is a detail view showing the crank shaft carried dip member.
Figure 3:
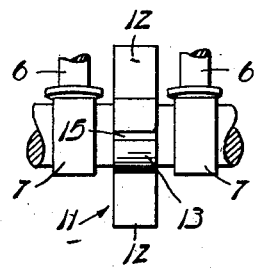
Fig. 3 is a like view of the splash diverting member.

Referring more particularly to the drawing, the numeral 1 designates the piston of an internal combustion engine, 2 the cylinder in which the piston reciprocates, 3 the piston rod which couples the piston to the crank shaft 4, the latter being journaled in suitable bearings within the crank case or chamber 5. The engine is provided with the usual valves having tappets 6 riding upon cam 7 fixed to the cam shaft 8. Within the crank case is a quantity of lubricant 9 into which a dip member 10, carried by the crank shaft, dips on every revolution of the shaft for splashing the lubricant about to lubricate the intended bearing surfaces.

According to the present invention, means are provided to receive the oil from the dip member and to divert or redirect the lubricant splash onto the more or less remote surfaces which have heretofore failed to receive an ample supply. For example, the wall of the engine cylinder 2 has failed to be properly lubricated because of its remote location and also because of the intervening crank shaft which obstructed the passage of the lubricant splash thereto. The splash diverting means comprises a member 11 arranged to one side of the orbital path of the shaft crank and within the path of the lubricant splash thrown up by the dip member so as to direct the lubricant around the crank shaft and up into the cylinder for thoroughly lubricating the wall portions thereof traversed by the piston. Preferably the diverting member 11 is movable in timed relation with the functioning of the dip member to receive the major portion of the splash and redirect its flow into the engine cylinder. This timed movement of the diverting member may be effected by suitable means and herein is accomplished through the engine cam shaft 8, and for this purpose such splash diverting member is secured to the cam shaft for rotating therewith. In the embodiment illustrated the diverting member is in the form of a bladed rotor having a plurality of radially extending wings or blades 12 which are designed to rotate into the splashing lubricant in a direction toward the engine cylinder so as to catch the splash and carry it in the direction of the cylinder as the lubricant is thrown by centrifugal force. Being carried by the cam shaft the rotating splash throwing blades will discharge the lubricant into the engine cylinder, resulting in a circuitous flow of the splash about the crank shaft. The cylinder wall will thereby receive sufficient lubricant for practical and efficient operation and with a minimum of wear. Since the lubricant is thrown centrifugally by the rotating diverting blades, the crank shaft will also be flooded with the lubricant for effecting proper lubrication of the pitman and crank bearings. Likewise, the cam and tappet surfaces will receive ample lubrication by reason of the location of the diverter between the cam 7.

Where the engine has plural cylinders, a like number of diverters will be provided, one for each cylinder.

The diverter may be of any particular form and shape and may be suitably attached to the cam shaft. In the illustrated embodiment the diverter comprises a pair of sheet metal sections each shaped intermediate its ends as at 13 to receive or partially embrace the cam shaft or a collar 14 fixed thereon. The opposite ends of the two sections are joined, as by spot welding, to constitute the splash receiving and throwing blades 12. The shaft or collar may be formed with recesses into which the interlocking ribs 15 may be pressed for anchoring the diverter in place. The dip member may likewise be suitably formed. As illustrated, it comprises a pair of legs 16 spot welded at their outer ends and having their inner ends deflected and perforated to receive the bolts 17 utilized in the coupling of the pitman 3 to the crank shaft 4. These legs or sections may be stamped from sheet metal and formed with one or more laterally extending lugs 18 designed to be bent downwardly over a wrench receiving face of the bolts or screws 13 to serve as a lock therefor.

The invention is practical in that it thoroughly lubricates all of the exposed surfaces. As the dip member scoops up the lubricant and throws it in the direction of the diverter, as indicated by the arrows 19, the blades 12 will turn into the splash in a counter-clockwise direction and throw the lubricant upwardly as indicated by the arrows 20 into the engine cylinder. The lubricant splashed by the dip member will be resplashed by the rapidly rotating diverter to redirect and throw the oil radially as well as laterally to effect lubrication of all of the exposed and accessible bearings. The cam shaft is connected to the crank shaft by the usual timing gears 21 and therefore will serve as a suitable means of timing the rotation of the splash diverting blades for timely receiving the lubricant splash. Obviously, the splash diverting blades may be mounted on a specially devised shaft for such purpose; therefore, the term cam shaft is used herein in a comprehensive manner.

In the particular embodiment illustrated the engine is of the four cycle type with the cam shaft being geared down to rotate once for every two rotations of the crank shaft. Consequently, the splash receiving paddles or blades 12 will alternately receive the successive splashes from the dip member. In the position of the parts shown in Fig. 1, with the piston in its uppermost position, the oil thrown up into the engine cylinder will spread sufficiently to effectively lubricate the cylinder wall as well as the usual wrist pin. By reason of the fact that the rotating blades are disposed laterally of the crank shaft and in a position to sling the oil up into the cylinder and on to the piston without obstruction by the crank shaft, it is apparent that the piston and cylinder will be lubricated in an efficient manner. This lubrication is effected without the necessity of a special oil pumping system which, in the past, has necessitated the provision of small ducts in the engine parts, which ducts were subject to becoming easily clogged by dirt, gum, carbon, or other foreign matter entering into the crank case oil.

Because of the location of the rotatable oil slinging member or diverter 11 to one side of the crank case, the lubricant is applied to the cylinder wall and piston without crank shaft obstruction. The two oil levels shown in Fig. 1 depict the maximum and minimum oil bodies through which the dip member 10 will move. The engine operating at a fast R. P. M. will cause the lubricant to be thrown upwardly toward the rotatable member 11 in what, to the naked eye, will be a continuous sheet or stream. At slower speeds the intermittent action will be more pronounced.

The foregoing description has been given in detail for clarity and ease of understanding without thought of limitation since the inventive principles involved are capable of assuming other physical embodiments without departing from the spirit of the invention and the scope of the appended claims.

What is claimed is:

1. A lubricating system for rotating and sliding parts of a mechanism, comprising a dip member movable with a rotating part to scoop lubricant out from a liquid bath and discharge it laterally, and a splash diverting blade movable into the laterally discharged lubricant in timed relation to directly receive the lubricant splash and divert it to the more inaccessible bearing portions of the mechanism.

2. A lubricating system for internal combustion engines having interconnected and oppositely rotating crank and cam shafts and a lubricant bath, comprising means carried by the crank shaft and dipping into the lubricant to splash it toward the other shaft, and a winged member carried by said cam shaft to be rotated thereby and having a transverse impact face movable into the oncoming splash to directly receive it from the dipping means and carry it about the crank shaft for discharge onto a bearing surface at the far side thereof.

3. A lubricating system for internal combustion engines having interconnected crank and cam shafts, a lubricant bath and valve means operable by the cam shaft, comprising a dip member carried by the crank shaft for dipping into the bath to splash lubricant toward the cam shaft, and a diverter rotatable by the cam shaft in a reverse direction relative to the movement of the dip member and movable into the oncoming splash for directly receiving it from the dip member and discharging it to the far side of the crank shaft.

4. A splash lubricating system for internal combustion engines having a crank shaft operating in a lubricant holding chamber and connected to a piston slidable in a cylinder at the far side of the shaft with an oppositely rotating cam shaft disposed laterally of and parallel to the crank shaft within the chamber, said lubricating system comprising means for splashing lubricant toward the cam shaft, and a member fixed on the cam shaft to rotate therewith and having a transversely extending face upon which the splashed lubricant impinges for deflection about the crank shaft and into the engine cylinder.

5. A splash lubricating system for internal combustion engines having a crank shaft operating in a lubricant holding chamber and connected to a piston slidable in a cylinder at the far side of the shaft with a cam shaft disposed laterally of and parallel to the crank shaft within the chamber, said lubricating system comprising a dip member carried by the crank shaft and operable to splash lubricant toward the cam shaft, and a splash diverting blade carried by the cam shaft and rotatable into the lubricant splash to directly receive it from the dip member and carry it about for discharge to the other side of the crank shaft into the engine cylinder.

6. An internal combustion engine having a crank shaft operating to splash lubricant laterally within a crank case, and a bladed rotor arranged in the crank case to one side of the crank shaft for rotating into the lubricant splash and diverting it about the crank shaft into the engine cylinder.

7. An internal combustion engine comprising a crank case and a communicating cylinder, a piston slidable in the cylinder, a crank shaft journaled in the case and connected to the piston, a cam shaft journaled in the case and operating in timed relation to and parallel with the crank shaft, the crank case having an oil chamber, a dip member carried by the crank shaft for dipping into the lubricant and splashing it toward the cam shaft, and a rotor carried by the cam shaft and having a surface moving into the lubricant splash for carrying it about the crank shaft and discharging it into the engine cylinder.

8. An internal combustion engine comprising a crank case and a communicating cylinder, a piston slidable in the cylinder, a crank shaft journaled in the case and connected to the piston, a cam shaft journaled in the case and operating in timed relation to and parallel with the crank shaft, the crank case having an oil chamber, a dip member carried by the crank shaft for dipping into the lubricant and splashing it toward the cam shaft, and splash diverting blade means carried by the cam shaft for rotating therewith into the splash to directly receive and divert it around the crank shaft into the engine cylinder.

GLEN R. STEELE.

REFERENCES CITED

The following references are of record in the file of this patent:

UNITED STATES PATENTS

| Number | Name | Date |
|---|---|---|
| 1,112,975 | Brush | Oct. 6, 1914 |
| 1,151,732 | Steedman | Aug. 31, 1915 |
| 1,271,140 | Dickey | July 2, 1918 |
| 1,291,157 | Robson | Jan. 14, 1919 |
| 2,183,667 | Buckendale | Dec. 19, 1939 |

FOREIGN PATENTS

| Number | Country | Date |
|---|---|---|
| 139,973 | Great Britain | Mar. 18, 1920 |